US012086778B2

United States Patent
Schnieders et al.

(10) Patent No.: US 12,086,778 B2
(45) Date of Patent: Sep. 10, 2024

(54) METHOD AND SYSTEM FOR OPERATING A MOBILE POINT-OF-SALES APPLICATION

(71) Applicant: Deutsche Telekom AG, Bonn (DE)

(72) Inventors: Dominik Schnieders, Aachen (DE); Stephan Spitz, Karlsfeld (DE); Hermann Geupel, Munich (DE)

(73) Assignee: DEUTSCHE TELEKOM AG, Bonn (DE)

( * ) Notice: Subject to any disclaimer, the term of this patent is extended or adjusted under 35 U.S.C. 154(b) by 148 days.

(21) Appl. No.: 17/868,801

(22) Filed: Jul. 20, 2022

(65) Prior Publication Data

US 2023/0022658 A1   Jan. 26, 2023

(30) Foreign Application Priority Data

Jul. 22, 2021   (EP) ..................................... 21187292

(51) Int. Cl.
*G06Q 20/20*   (2012.01)
*G06Q 20/32*   (2012.01)
(Continued)

(52) U.S. Cl.
CPC ........... *G06Q 20/20* (2013.01); *G06Q 20/206* (2013.01); *G06Q 20/3226* (2013.01); *G06Q 20/401* (2013.01); *H04W 88/02* (2013.01)

(58) Field of Classification Search
CPC .. G06Q 20/20; G06Q 20/206; G06Q 20/3226; G06Q 20/401; G06Q 20/202;
(Continued)

(56) References Cited

U.S. PATENT DOCUMENTS

| | | | |
|---|---|---|---|
| 6,363,488 B1* | 3/2002 | Ginter .............. | H04N 21/44204 375/E7.009 |
| 2001/0044904 A1* | 11/2001 | Berg ................... | G06F 21/6218 726/26 |

(Continued)

FOREIGN PATENT DOCUMENTS

WO   WO 2020243961 A1   12/2020

OTHER PUBLICATIONS

Hu, Bo, et al. "A Robust Retail POS System Based on Blockchain and Edge Computing." (2018). (Year: 2018).*

*Primary Examiner* — Russell S Glass
(74) *Attorney, Agent, or Firm* — Leydig, Voit & Mayer, Ltd.

(57) ABSTRACT

A method for operating a mobile Point-of-Sales (mPOS) application includes: an application frontend of the mPOS application is installed and launched on a terminal device connected to a communication network via a secure connection; an application backend of the mPOS application is installed and launched on an edge cloud server of the communication network; the application frontend, for starting a transaction associated with the mPOS application, transmits a transaction request indicating the transaction to be started and comprising transaction data associated with the indicated transaction to the application backend via the connection; the application backend transmits an authorization request to the application frontend via the connection; the application frontend authorizes the requested transaction and transmits a transaction authorization to the application backend via the connection; and the application backend completes the transaction.

10 Claims, 1 Drawing Sheet

(51) Int. Cl.
*G06Q 20/40* (2012.01)
*H04W 88/02* (2009.01)

(58) Field of Classification Search
CPC .. G06Q 20/204; G06Q 20/3223; H04W 88/02
USPC .......................................................... 705/16
See application file for complete search history.

(56) References Cited

U.S. PATENT DOCUMENTS

| | | | |
|---|---|---|---|
| 2003/0120935 A1* | 6/2003 | Teal | H04L 63/0823 |
| | | | 713/188 |
| 2008/0275995 A1* | 11/2008 | Soliman | H04L 41/12 |
| | | | 726/28 |
| 2011/0231272 A1* | 9/2011 | Englund | G07G 1/0081 |
| | | | 705/21 |
| 2011/0231285 A1* | 9/2011 | Englund | G06Q 30/0603 |
| | | | 705/27.1 |
| 2014/0046786 A1* | 2/2014 | Mazaheri | G06Q 20/4016 |
| | | | 705/18 |
| 2014/0307549 A1* | 10/2014 | Kotecha | H04L 47/2441 |
| | | | 370/235 |
| 2015/0178706 A1* | 6/2015 | Galvin | H04L 67/56 |
| | | | 705/21 |
| 2016/0132853 A1* | 5/2016 | Kumar | G06Q 20/325 |
| | | | 705/18 |
| 2016/0277191 A1* | 9/2016 | Lee | H04W 76/11 |
| 2017/0164404 A1* | 6/2017 | Sundararajan | H04L 1/0018 |
| 2017/0171804 A1* | 6/2017 | Waltermann | H04W 40/02 |
| 2019/0228374 A1* | 7/2019 | Hicks | G06Q 20/204 |
| 2020/0058008 A1* | 2/2020 | Hicks | G06K 7/0004 |
| 2022/0413184 A1* | 12/2022 | Cagliergin | G01W 1/06 |

* cited by examiner

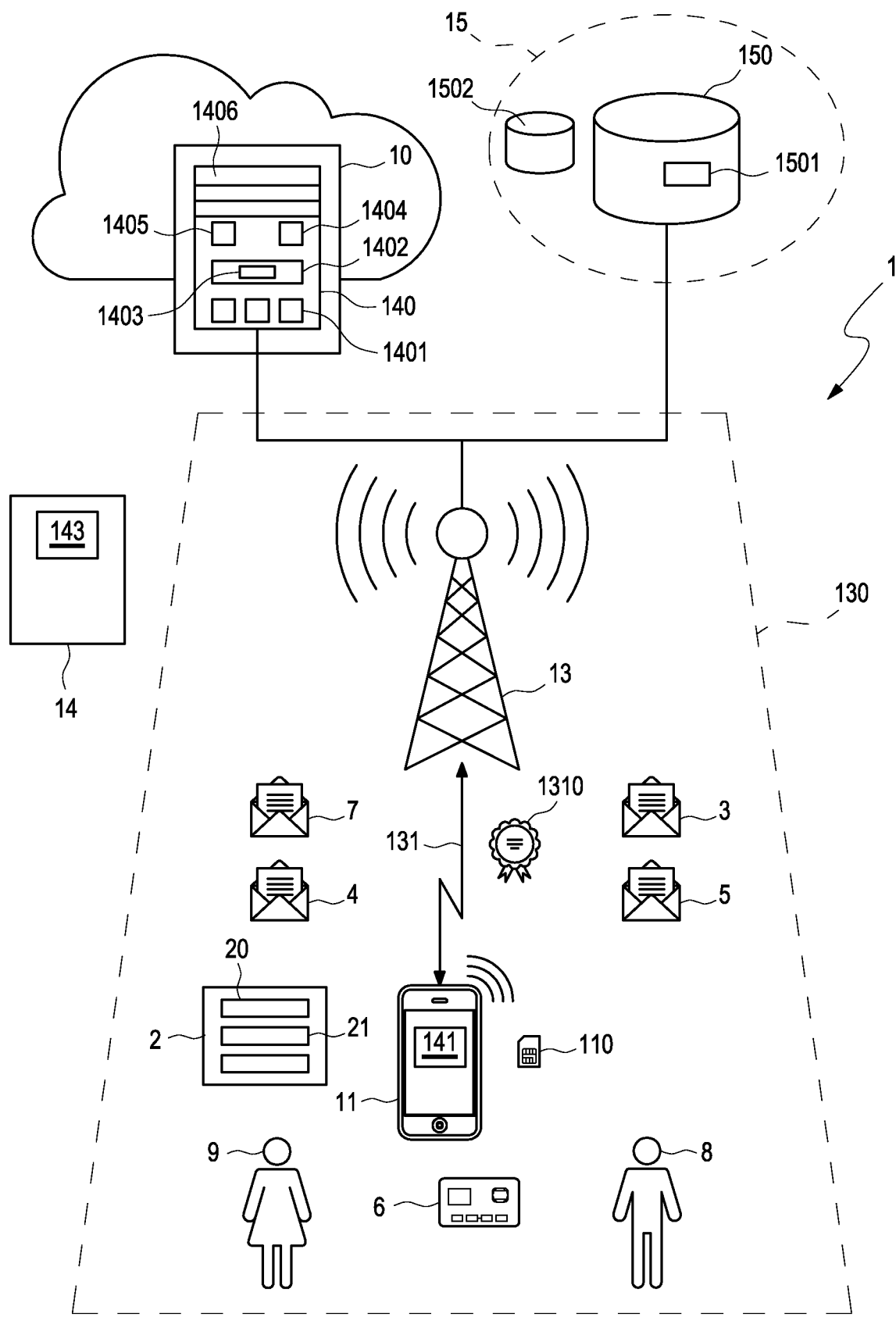

METHOD AND SYSTEM FOR OPERATING A MOBILE POINT-OF-SALES APPLICATION

CROSS-REFERENCE TO PRIOR APPLICATIONS

This application claims benefit to European Patent Application No. EP 21 187 292.4, filed on Jul. 22, 2021, which is hereby incorporated by reference herein.

FIELD

The invention relates to a method for operating a mobile Point-of-Sales (mPOS) application in a communication network. Furthermore, the invention relates to a system for operating a mPOS application in a communication network.

BACKGROUND

A mPOS application is used for completing a purchase, particularly a transaction, e.g. a payment, and is usually executed on a COTS (Common of the Shelf) device.

The mPOS application (i.e. the COTS device) is assigned to and configured for a particular user (e.g. a merchant). For operating a mPOS application, particularly for completing a transaction, the user provides the COTS device with transaction data. The transaction data may be automatically provided by the mobile point-of-sale (POS) application implemented on the COTS device or manually provided by the user operating a human machine interface of the COTS device, e.g. by hitting a keypad of the COTS device or by touching a keypad displayed by a touch screen of the COTS device. The transaction data to be provided at least comprises a transaction amount, e.g. an amount of money corresponding to a price of a product to be sold.

During a normal operation of the mPOS application, the mPOS application is executed by the COTS device that is connected via a connection to a communication network. When the mPOS application is provided with the transaction data, a further user (e.g. a customer) is required to check the provided transaction data, to provide further transaction data (e.g. data indicating an account to be debited) and to authorize the transaction. The further user may provide a transaction device comprising the further transaction data (e.g. a payment card or a further terminal device) for being read by the COTS device, and additionally provide a personal key (e.g. a personal identification number (PIN)) by operating the human machine interface of the COTS device (e.g. by hitting a keypad of the COTS device or by touching a keypad displayed by a touch screen of the COTS device). When the provided personal key matches the transaction device the mPOS application considers the transaction to be authorized and completes the transaction by transmitting a transaction request indicating the transaction and comprising the transaction data, the further transaction data and a corresponding transaction authorization via the connection to a remote network server, particularly to a payment system as part of a payment infrastructure that is installed on the remote network server.

As described above, the further user has to have his transaction device read by the COTS device and to operate the COTS device for authorizing the transaction. The further user may suffer from a certain discomfort or anxiety in presenting sensitive account data. Such a mPOS application is exposed to many attacks. An attack surface of a standard Android/iOS device is quite high. For this reason, mPOS solutions on a COTS device are combined with an extensive external monitoring system, which guarantees the health of the device. However, this monitoring is complex and has a performance impact, too. Moreover, a mPOS application on a COTS device requires a complex setup and personalization procedure in which a respective merchant and the COTS device have to be verified remotely. These shortcomings may reduce a wide acceptance of such methods and systems for completing a transaction.

SUMMARY

In an exemplary embodiment, the present invention provides a method for operating a mobile Point-of-Sales (mPOS) application. The method includes: an application frontend of the mPOS application is installed and launched on a terminal device connected to a communication network via a secure connection; an application backend of the mPOS application is installed and launched on an edge cloud server of the communication network; the application frontend, for starting a transaction associated with the mPOS application, transmits a transaction request indicating the transaction to be started and comprising transaction data associated with the indicated transaction to the application backend via the connection; the application backend, upon receipt of the transaction request, transmits an authorization request to the application frontend via the connection; the application frontend, upon receipt of the authorization request, authorizes the requested transaction and transmits a transaction authorization to the application backend via the connection; and the application backend, upon receipt of the transaction authorization and the transaction data, completes the transaction.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 1 schematically shows an entity diagram of a system according to the invention for operating a mPOS application.

DETAILED DESCRIPTION

Exemplary embodiments of the invention provide a method for operating a mPOS application which provides a safe protection of both sensitive data and health of the merchant's device. Exemplary embodiments of the invention further provide a system for operating a mPOS application.

A first aspect of the invention is a method for operating a mobile Point-of-Sales (mPOS) application, comprising the steps:
an application frontend of the mPOS application is installed and launched on a terminal device connected to a communication network via a secure connection,
an application backend of the mPOS application is installed and launched on an edge cloud server of the communication network,
the application frontend, for starting a transaction, transmits a transaction request indicating the transaction to be started and comprising transaction data associated with the indicated transaction to the application backend via the connection, the application backend, upon receipt of the transaction request, transmits an authorization request to the application frontend via the connection, the application frontend, upon receipt of the authorization request, authorizes the requested transaction and transmits a transaction authorization to the application backend via the connection, and the application backend, upon receipt of the transaction authorization and the transaction data, completes the transaction.

According to the invention, the mPOS application is a distributed application with an application backend and an application frontend which are executed on different devices arranged remote from each other (i.e. the edge cloud server and the terminal device, respectively).

According to the invention, the integrity of a mPOS solution (i.e. a mPOS application) is ensured by designing the mPOS application as a distributed application and operating sensitive parts/steps of the mPOS application in a secure environment by installing the application backend in an edge cloud server. The edge cloud server provides the desired secure environment. Both the application backend and the application frontend may be implemented as a software program product.

The terminal device may be a dedicated terminal device or a general terminal device (e.g. a smartphone or the like), which is operated by a user (e.g. a merchant). The application backend and the application frontend communicate with each other via the connection provided by the communication network. The application backend completes the transaction upon receipt of both the transaction request and the transaction authorization. While the transaction request comprises transaction data required for completing the transaction (e.g. an amount of money corresponding to a price of a product and/or account data), the transaction authorization is caused by a personal key (e.g. a personal identification number (PIN)), which is correctly provided by a further user (e.g. a customer buying the product from the merchant).

According to the invention the application frontend acts, upon launch, as an I/O interface and communicates with the application backend via the connection provided by the communication network and the application backend executes, upon launch, a program code realizing all steps of the mPOS application that are sensitive and worthy of protection.

In many embodiments, authorizing the requested transaction comprises reading further transaction data from a transaction device separate from the terminal device and arranged close to the terminal device and adding the read further transaction data to the transaction authorization. In further embodiments, completing the transaction comprises transmitting a transaction confirmation to the application frontend. The separate transaction device is exclusively presented to the terminal device. The further transaction data may comprise, for example, account data of the customer, or a personal key of the further user. The transaction device may be wirelessly read by the terminal device using near field communication (NFC) or Bluetooth.

The transaction confirmation indicates a success of the transaction or an error preventing a success of the transaction. The transaction confirmation may be transmitted to the terminal device via a messaging service of the communication network (e.g. short message service (SMS)).

Preferably, authorizing the requested transaction comprises reading account data as the further transaction data and authorization data from a credit card or a debit card as the transaction device and a payment is completed as the transaction. Credit cards and debit cards are used by a plurality of further users and, hence, are particularly important transaction devices to be supported for improving an acceptance and extending an application of the method. The transaction data and the further transaction data, particularly the payment data for the payment transaction, particularly a PAN and, if necessary, a PIN are requested and received via the application frontend and securely transmitted from the application frontend via the connection to the application backend. All payment data is securely processed in the cloud. Payment data is mainly the PAN (Primary Account Number of the merchant's customer) and the PIN if a certain transaction value is exceeded. Both PAN and PIN are securely transmitted from the terminal device to the application backend executed in the edge cloud server.

According to the invention, an edge cloud server located close to the terminal device executes the application backend as backend server. The edge cloud server is arranged in a vicinity (i.e. in a spatial vicinity and/or in a logical vicinity) of the terminal device and, hence, allows for a particularly low round trip time (RTT) in completing the transaction which further increases the acceptance of the method.

The application backend provides at least one transaction interface that communicates with the terminal device. The terminal device provides a human machine interface (e.g. a keypad or a touch screen) and a reading interface for communicating with the transaction device. The application backend may receive the transaction data, further transaction data and the transaction authorization via the at least one transaction interface connected with the terminal device (e.g. with the human machine interface and the reading interface of the terminal device). The transaction data, the further transaction data and the transaction authorization have previously been provided by a user or a further user by operating the human machine interface of the terminal device (e.g. by hitting a keypad of the terminal device or by touching a keypad displayed by a touch screen of the terminal device, or by the transaction device by being read via the reading interface). The human machine interface and the reading interface of the terminal device form part of the application frontend installed on the terminal device. The application frontend provides the reading interface (e.g. a CLF chip) for wirelessly reading the transaction device, such as a credit card, using near field communication (NFC) or Bluetooth. Such reading interface provides its inputs via the connection to a protected payment kernel provided by the application backend. The payment kernel may provide a transaction interface on its own directly receiving the further transaction data from the reading interface of the application frontend. That means that the application backend may provide a first transaction interface communicating with the human machine interface of the terminal device and a second transaction interface communicating with the reading interface of the terminal device. All data received via the first transaction interface and the second transaction interface are consolidated by the payment kernel of the application backend.

The execution of the sensitive mPOS application steps in the edge cloud server not only increases user convenience and security during a payment transaction, but also simplifies on-boarding of a merchant with his/her terminal device and reduces security-dependencies on the terminal device.

Since most of the security critical processes may be moved from the terminal device to the edge cloud server the security and scalability advantages of a highly-performance edge cloud server can be leveraged for executing frontend payment processes.

The transaction is initiated and authorized by a user (e.g. a merchant) and a further user (e.g. a customer) by operating the terminal device (i.e. by using the terminal device as an I/O interface). However, the real transaction and the processing of the sensitive transaction data and the sensitive further transaction data are performed and completed by the application backend in the edge cloud server. That means that the sensitive mPOS functionality part of the mPOS application is executed in a trustworthy environment (i.e. in the edge cloud server of the communication network).

Still preferably, the mPOS application is operated using a cellular network as the communication network and the edge cloud server is located close to a radio cell of the cellular network the terminal device is arranged in. The cellular network allows for carrying out the method practically at any place and, hence, strongly improves an applicability of the method. Apart from that, protection against fraud may be improved by ensuring the terminal device (and thus the application frontend) is very close to the application backend, thus guaranteeing an immediate completion of the transaction.

A quality service of the communication network may advantageously apply a respective predetermined service quality to the connection. The predetermined service quality (e.g. a quality of service (QoS)) may comprise a maximum latency and/or a minimum bitrate, particularly a low maximum latency and/or a high bitrate, which accelerate the completion of the transaction and, at the same time, may effectively reduce a jitter of the connection. The predetermined service quality allows for a short response time when completing the transaction which further increases the acceptance of the method. The quality service is a service of the communication network for managing the service quality (e.g. the maximum latency and/or the minimum bitrate) of the connection provided by the communication network. For instance, the quality service may communicate with the application backend and/or the application frontend in order to adjust the service quality adequate for a constellation and/or an actual load of the communication network. A managed latency service (i.e. a low and stable latency) may be applied to the mPOS application wherein the communication network applies a given prioritization to the mPOS application and additionally provides a feedback loop to the mPOS application. With that a low and stable latency can be achieved for the transaction of the application frontend at the terminal device with the application backend in the edge cloud server ensuring that an offloading of part of the transaction to the edge cloud server is working properly and does not cause any inconvenience to the user (e.g. the merchant) and/or the further user (e.g. the customer).

The predetermined service quality may be applied dependent on a subscriber identity provided by a subscriber identity module of the terminal device. The subscriber identity module (SIM) of the terminal device defines the respective service qualities the user is paying for.

Additionally or alternatively, the respective predetermined service quality may be applied dependent of a unique quality identifier provided by the application frontend. The application frontend provides the unique quality identifier to the quality service which adjusts the service quality dependent of the unique quality identifier. Thus, the unique quality identifier may cause the quality service to provide the connection even with a higher service quality than paid for by the user. Accordingly, the response time for completing the transaction may even be shorter than paid for by the user.

In an advantageous embodiment, the predetermined service quality is applied dependent on an application ID of the mPOS application, an access point name (APN)/data network name (DNN) or a combination comprising an (interne protocol) IP address and a port number as the unique quality identifier. The application ID may be registered in advance and is accessible for the quality service. For instance, an entry of a registration database that is accessible for the quality service, may assign the service quality to the application ID. The APN/DNN and the combination comprising the IP address and the port number involved in operating the mPOS application are communication characteristics known by the communication network and, thus, accessible for the quality service.

The application frontend may store the unique quality identifier. In other words, the user requesting the transaction statically defines the service quality to be applied to the connection.

Alternatively, the application frontend causes the application backend to generate the unique quality identifier. In other words, the service quality to be applied to the connection is defined dynamically. The application backend, thereby, may communicate with the quality service and take into account a constellation and/or an actual load of the communication network.

Preferably, the application frontend may request additional transaction data for completing the transaction and add the additional transaction data to the transaction authorization. The additional transaction data may comprise an e-mail address defining where a transaction record (e.g. a bill) is to be sent when completing the transaction. Further, it is possible that the application frontend or the application backend stores these additional transaction data which once have been received from a certain further user (e.g. a certain customer) for further future transactions for said further user. Storing the additional transaction data relieves the further user from repeatedly providing the additional transaction data for each transaction to complete. Hence, a comfort and an acceptance of the method is further increased.

In exemplary embodiments, the application frontend authenticates a user of the terminal device. Authenticating the user (e.g. the merchant) increases a safety of the method which results in a further increased acceptance of the method.

In further exemplary embodiments, the at least one transaction interface of the application backend is used for personalization and payment transaction. The application backend further comprises a secure key storage and, as already mentioned, a protected payment kernel with a secure interface to a payment host located in a remote transaction infrastructure installed on at least one separate network server. That means that the application frontend merely realizes an input/output interface (i.e. the terminal device merely serves as input/output interface (i.e. I/O terminal) without any further data processing functionality). All entries from the user and/or the further user are received via the input/output interface (i.e. the application frontend) and then transmitted over the secure connection to the edge cloud server and ultimately processed in the application backend installed on the edge cloud server. Any reactions and data processing results are generated in the edge cloud server and then sent back to the application frontend (i.e. the input/output interface) and output from there.

For authenticating the user of the terminal device, the user provides the application frontend with a user ID by operating the input/output interface of the terminal device (e.g. by hitting a keypad or by touching a keypad displayed by a touch screen of the terminal device). The user ID is transmitted via the secure connection to the application backend. The user ID may be registered in advance in a personalization database located and installed on a separate remote network server. The personalization database is accessible for the application backend. For instance, an entry of the personalization database may assign the user ID to the application ID. Therefore, the application backend compares the user ID entered via the terminal device with all entries in the personalization database and authenticates the user only if there is an entry in the personalization database matching the entered user ID. For communicating with the personalization database the application backend may provide a personalization logic which is configured to receive and process the entered user ID from the application frontend and to compare it with all entries of the personalization database. Authenticating the user (e.g. the merchant) increases a safety of the method which results in a further increased acceptance of the method As the application backend carrying out the whole payment procedure is executed in the edge of the communication network (i.e. in the edge cloud server), the terminal device (e.g. the merchant's phone), which is receiving the payment, acts only as I/O terminal which captures the user input and receives the payment information from the credit/EMV card from the merchant's customer. This demands that I/O drivers of the mPOS application are split into a hardware dependent low-level part forming part of the application frontend and being executed on the terminal device as the I/O interface and a high-level part forming part of the application backend and being executed in the edge cloud server.

As the application backend is installed in the edge cloud server, the deployment and update of the mPOS application may be centrally managed by one authorized entity.

According to further embodiments, more than one instance of the application backend are provided on the edge cloud server simultaneously, each instance being assigned to and personalized for a respective user (e.g. merchant). That means that every merchant owns one virtual mPOS terminal in the edge cloud server which is personalized for him. Such personalization process takes place, as described before, in the cloud (i.e. via a communication between the application backend installed on the edge cloud server and the network server hosting the personalization database) and, therefore, cannot be interfered with by an attacker. The application frontend again serves as I/O interface which allows a future user to provide his/her personal data such as a user ID for being registered in the personalization database as being associated with the application ID of the mPOS application.

Another aspect of the invention is a system for operating a mPOS application, comprising a mPOS application, a terminal device, an application frontend of the mPOS application to be executed by the terminal device, an edge cloud server, an application backend to be executed by the edge cloud server and a communication network for connecting the terminal device and the edge cloud server via a connection, wherein the terminal device, the application frontend, the edge cloud server, the application backend and the communication network are configured for together carrying out a method according to the present invention and as described herein.

According to one embodiment of a system according to the invention, the application backend provides a secure transaction interface for personalization and transaction, a secure key storage and/or a protected payment kernel with a secure interface to a separate transaction infrastructure comprising a transaction host, e.g. a payment host. The transaction interface for personalization may be connected with a personalization logic executed by the application backend. Such personalization logic is configured to interact with a personalization server hosting a personalization database and being located in the separate transaction infrastructure in the cloud.

As the system comprises an edge cloud server and a terminal device (e.g. smartphone or the like) and a mPOS application (e.g. implemented as a software program product) distributed among the two devices, there is a plurality of possible applications of the invention.

The system may be created by simply installing the application backend on the backend server (i.e. the edge cloud server and the application frontend on the terminal device, respectively).

According to the invention, the terminal device, the application frontend, the application backend, the edge cloud server and the communication network are configured for together carrying out an inventive method. Due to the configuration, the involved devices together provide a method for completing the transaction safely (i.e. protecting both sensible data and health of the terminal device).

It is an advantage of the invention that the processing of the transaction data, the transaction authorization and, eventually, additional transaction data is executed in the edge cloud server. The method, hence, increases user convenience and security when operating the mPOS application and simplifies the on-boarding of a merchant with his/her device and reduces security-dependencies on the merchant's terminal device. Since most of the security critical processes are moved from the terminal device to the edge cloud server, the security and scalability advantages of a high performance edge cloud server can be leveraged for executing mPOS applications, particularly payment transactions.

Further advantages and configurations of the invention become apparent from the following description and the enclosed drawings.

It shall be understood that the features described previously and to be described subsequently may be used not only in the indicated combinations but also in different combinations or on their own without leaving the scope of the present invention.

The invention is described in detail by means of an exemplary embodiment and with reference to the drawing. Like components are indicated by like reference numerals throughout the drawing.

FIG. 1 schematically shows an entity diagram of a system 1 according to the invention for operating a mPOS application 14. The system 1 comprises the mPOS application 14, a terminal device 11, an application frontend 141 of the mPOS application 14 to be executed by the terminal device 11, and an edge cloud server 10, an application backend 140 to be executed by the edge cloud server 10 and a communication network 13 for connecting the terminal device 11 and the edge cloud server 10, wherein the terminal device 11, the application frontend 141, the edge cloud server 10, the application backend 140 and the communication network 13 are configured for together carrying out the following method (i.e. for executing the following steps).

The edge cloud server 10 connected to the communication network 13 executes the application backend 140 of the mPOS application 14. The edge cloud server is located close to the terminal device 11. When the mPOS application 14 is operated using a cellular network as the communication network 13, the edge cloud server 10 may be located close to a radio cell 130 of the cellular network the terminal device 11 is arranged in.

The terminal device 11 connected to the communication network 13 via a secure connection 131 executes the application frontend 141 of the mPOS application 14. The application frontend 141 may authenticate a user 8 (e.g. a merchant) of the terminal device 11.

The application frontend 141, for starting a transaction 2 associated with operating the mPOS application, transmits a transaction request 3 indicating the transaction 2 to be started and comprising transaction data 20 (e.g. an amount of money corresponding to a price of a product) associated with the indicated transaction 2 to the application backend 140 via the connection 131.

A quality service of the communication network 13 preferably applies a respective predetermined service quality 1310 to the connection 131.

The predetermined service quality 1310 may be applied dependent on a subscriber identity provided by a subscriber identity module 110 of the terminal device 11.

The respective predetermined service quality 1310 is preferably applied dependent of a unique quality identifier provided by the application frontend 141.

The predetermined service quality 1310 may be exemplarily applied dependent on an application ID 143 of the mPOS application 14, an access point name (APN)/data network name (DNN) or a combination comprising an IP address and a port number as the unique quality identifier.

The application frontend 141 may store the unique quality identifier.

Alternatively, the application frontend 141 may cause the application backend 140 to generate the unique quality identifier.

The application backend 140, upon receipt of the transaction request 3, transmits an authorization request 4 to the application frontend 141 via the connection 131.

The application frontend 141, upon receipt of the authorization request 4, authorizes the requested transaction 2 (e.g. by requiring a personal key like a personal identification number (PIN) of a further user 9 (e.g. a merchant's customer)), and transmits a transaction authorization 5 to the application backend 140 via the connection 131. Authorizing the requested transaction 2 may comprise reading further transaction data 21 from a transaction device 6 (e.g. a credit card or a debit card of the further user 9), separate from the terminal device 11 and arranged close to the terminal device 11 and adding the read further transaction data 21 to the transaction authorization 5. The transaction device 6 is provided by the further user 9.

The application backend 140, upon receipt of the transaction authorization 5, completes the transaction 2. Completing the transaction 2 comprises transmitting a transaction confirmation 7 to the application frontend 141. When a credit card or a debit card is used as the transaction device 6, a payment is completed as the transaction 2. The application backend 140 provides a transaction interface 1401 which is configured to receive the transaction request 3 comprising transaction data 20 which have been entered by the user via an I/O interface, such as a touch display, of the terminal device 11. The application backend 140 further provides a payment kernel 1402 which is configured to receive the further transaction data 21, previously wirelessly read by the terminal device 11 from the transaction device 6 using near field communication (NFC) or Bluetooth. The payment kernel 1402 is logically connected with the transaction interface 1401 and further provides a secure interface/client unit 1403 configured to communicate with a transaction/payment host 1501 of a transaction/payment system 150 of a respective customer located in a remote transaction infrastructure 15. The application backend 140 further provides a secure key storage 1404 storing keys used to encrypt all data transferred between the application backend 140 and the application frontend 141, thus providing the secure connection 131. The application backend further provides a further interface 1405 and a personalization logic 1406. The personalization logic 1406 is configured to communicate with a personalization server 1502 located in the remote transaction infrastructure 15. The personalization server 1502 comprises a personalization database whose entries allow to authenticate the user 8 of the terminal device 11 via a user ID which is to be provided by the user 8 to the application frontend 141, and an application ID of the mPOS application 14. The user ID may be registered in advance in the personalization database located and installed on the personalization server 1502 located in the remote transaction infrastructure 15. The personalization database is accessible for the application backend 140. For instance, an entry of the personalization database may assign the user ID to the application ID. Therefore, the application backend 140 compares the user ID entered via the terminal device 11 with all entries in the personalization database and authenticates the user 8 only if there is an entry in the personalization database matching the entered user ID. The personalization logic is configured to receive and process the entered user ID from the application frontend 141 and to compare it with all entries of the personalization database.

The application backend 140 with all its components is configured to process all data associated with the transaction 2 and complete the requested transaction 2.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS 1 system
10 edge cloud server
11 terminal device
110 subscriber identity module
13 communication network
130 radio cell
131 connection
1310 service quality
133 quality service
14 mPOS application
140 application backend
1401 transaction interface
1402 payment kernel
1403 client unit
1404 secure key storage
1405 interface
1406 personalization logic
141 application frontend
143 application ID
15 remote transaction infrastructure
150 transaction system
1501 transaction host
1502 personalization server
2 transaction
20 transaction data
21 further transaction data
3 transaction request
4 authorization request
5 transaction authorization
6 transaction device
7 transaction confirmation
8 user
9 further user

The invention claimed is:

1. A method for operating a mobile point-of-sale (mPOS) application, comprising:
   an application frontend of the mPOS application is installed and launched on a terminal device connected to a communication network via a secure connection;
   an application backend of the mPOS application is installed and launched on an edge cloud server of the communication network;
   the application frontend, for starting a transaction associated with the mPOS application, transmits a transaction request indicating the transaction to be started and comprising transaction data associated with the indicated transaction to the application backend via the connection;
   the application backend, upon receipt of the transaction request, transmits an authorization request to the application frontend via the connection;
   the application frontend, upon receipt of the authorization request, authorizes the requested transaction and transmits a transaction authorization to the application backend via the connection; and
   the application backend, upon receipt of the transaction authorization and the transaction data, completes the transaction;
   wherein a quality service of the communication network applies a respective predetermined service quality to the connection based on applying a managed latency service to the connection, and wherein the communication network and the edge cloud server apply a given prioritization to the mPOS application and provide a feedback loop;
   wherein the respective predetermined service quality is applied based on a unique quality identifier provided by the application frontend; and
   wherein the respective predetermined service quality is applied further based on an application ID of the mPOS application, an access point name/data network name, or a combination comprising an IP address and a port number as the unique quality identifier.

2. The method according to claim 1, wherein authorizing the requested transaction comprises:
   reading further transaction data from a transaction device separate from the terminal device and arranged close to the terminal device; and
   adding the read further transaction data to the transaction authorization.

3. The method according to claim 2, wherein authorizing the requested transaction comprises reading account data as the further transaction data and authorization data from a credit card or a debit card as the transaction device; and
   wherein a payment is completed as the transaction.

4. The method according to claim 1, wherein completing the transaction comprises transmitting a transaction confirmation to the application frontend.

5. The method according to claim 1, wherein the mPOS application is operated using a cellular network as the communication network and the edge cloud server is located close to a radio cell of the cellular network the terminal device is arranged in.

6. The method according to claim 1, wherein the application frontend stores the unique quality identifier.

7. The method according to claim 1, wherein the application frontend authenticates a user of the terminal device.

8. The method according to claim 1, further comprising:
   providing more than one instance of the application backend on the edge cloud server simultaneously, each instance being assigned to and personalized for a respective user.

9. A system for operating a mobile point-of-sale (mPOS) application, comprising:
   a terminal device; and
   an edge cloud server of a communication network;
   wherein the terminal device is configured to execute an application frontend of the mPOS application;
   wherein the edge cloud server is configured to execute an application backend of the mPOS application;
   wherein the communication network is configured to connect the terminal device and the edge cloud server via a connection;
   wherein the application frontend of the mPOS application is configured to be installed and launched on the terminal device;
   wherein the application backend of the mPOS application is configured to be installed and launched on the edge cloud server of the communication network;
   wherein the application frontend, for starting a transaction associated with the mPOS application, is configured to transmit a transaction request indicating the transaction to be started and comprising transaction data associated with the indicated transaction to the application backend via the connection;
   wherein the application backend is configured to, upon receipt of the transaction request, transmit an authorization request to the application frontend via the connection;
   wherein the application frontend is configured to, upon receipt of the authorization request, authorize the requested transaction and transmit a transaction authorization to the application backend via the connection;

wherein the application backend is configured to, upon receipt of the transaction authorization and the transaction data, complete the transaction;

wherein a quality service of the communication network is configured to apply a respective predetermined service quality to the connection based on applying a managed latency service to the connection, and wherein the communication network and the edge cloud server are configured to apply a given prioritization to the mPOS application and provide a feedback loop;

wherein the respective predetermined service quality is applied based on a unique quality identifier provided by the application frontend; and wherein the respective predetermined service quality is applied further based on an application ID of the mPOS application, an access point name/data network name, or a combination comprising an IP address and a port number as the unique quality identifier.

10. The system according to claim 9, wherein the application backend provides a secure transaction interface for personalization and transaction, a secure key storage storing keys used to secure the connection, and a protected kernel with a secure interface to a remote transaction infrastructure.

\* \* \* \* \*